United States Patent [19]

Sadler

[11] Patent Number: 5,150,670

[45] Date of Patent: Sep. 29, 1992

[54] RADIAL INTERNAL COMBUSTION ENGINE

[75] Inventor: William G. Sadler, Scottsdale, Ariz.

[73] Assignee: Harold W. Gewald, Coupeville, Wash.

[21] Appl. No.: 506,443

[22] Filed: Apr. 6, 1990

[51] Int. Cl.⁵ ............................................. F02B 75/22
[52] U.S. Cl. ............................... 123/55 R; 123/196 R
[58] Field of Search ............... 123/55 R, 55 A, 55 SR, 123/197 R, 197 AC, 196 R

[56] References Cited

U.S. PATENT DOCUMENTS

| | | | |
|---|---|---|---|
| 444,904 | 1/1891 | Pyle | 123/55 A |
| 657,662 | 9/1900 | Roche | 123/55 A |
| 1,639,333 | 8/1927 | Ford | 123/55 A |
| 1,882,448 | 10/1932 | Roche | 123/55 A |
| 1,962,530 | 6/1934 | Schubert . | |
| 1,967,596 | 7/1934 | Schubert . | |
| 2,088,863 | 8/1937 | McClelland | 123/55 A |
| 2,280,385 | 4/1942 | Dickson . | |
| 2,533,558 | 12/1950 | Chilton . | |
| 2,675,791 | 4/1954 | Lundquist | 123/55 A |
| 3,123,058 | 3/1964 | Wooge . | |
| 3,308,797 | 3/1967 | Buyatti et al. . | |
| 4,622,933 | 11/1986 | Fukuo et al. | 123/196 R |
| 4,727,794 | 3/1988 | Kmicikiewics | 123/197 R |
| 4,784,093 | 11/1988 | Pfeffer et al. | 123/196 R |
| 4,793,301 | 12/1988 | Ishikawa | 123/196 R |

FOREIGN PATENT DOCUMENTS

| | | | |
|---|---|---|---|
| 11244 | 12/1906 | Austria | 123/55 A |
| 1064697 | 5/1954 | France | 123/55 A |
| 202625 | 1/1937 | Switzerland | 123/55 A |

Primary Examiner—David A. Okonsky
Attorney, Agent, or Firm—Gunn, Lee & Miller

[57] ABSTRACT

A radial internal combustion engine comprises an engine housing and a plurality of piston-cylinder pairs arranged on the periphery of the housing. The piston-cylinder pairs are arranged in two rows, three cylinders in each row. A connecting rod connects each piston to the crankshaft axially disposed within the engine housing. The connecting rods terminate in an arcuate flange. The connecting rods in each row of cylinders lie in a common plane equally sharing the crankshaft journal bearing surface. Lubrication about the crankshaft journal is provided through an oil flow passage which extends through the crankshaft for lubricating the crankshaft journal an the valve train of the engine.

6 Claims, 3 Drawing Sheets

RADIAL INTERNAL COMBUSTION ENGINE

BACKGROUND OF THE DISCLOSURE

The present invention is directed to an internal combustion engine, particularly, to a four cycle radial internal combustion engine for use in the aircraft, automotive, marine and industrial fields.

The four-stroke internal combustion engine with its inherent reliability and fuel economy is well known. It has been used in various products, ranging from lawn mower engines to automobiles. Such engines, however, are hampered by low power-to-weight ratio which is inherent in four-stroke engines.

U.S. Pat. No. 1,962,530 and U.S. Pat. No. 1,967,596, both issued to J. Schubert, exemplify the state of the prior art relating to two cycle internal combustion radial engines. As noted by Schubert, many attempts have been made to produce a practical two cycle engine suitable for aircraft or other power plants to replace the typically heavy, complex and expensive four cycle engine which was in general use. Some of the essential factors considered by Schubert in the design of his two cycle engine were proper lubrication, cooling, fuel distribution, high volumetric and thermal efficiency, speed and low weight per horsepower. The two cycle engine however is very noisy, producing what has been referred to as a maniacal whine, and is not as smooth running as the four cycle engine.

It is therefore an object of the present invention to provide a highly efficient low weight four cycle engine in the 45 to 65 horsepower range. The four cycle radial engine of the present disclosure combines the advantages of both the four cycle and the two cycle engines heretofore known in the prior art. The radial engine of the present disclosure runs with the smoothness one would expect from a four-stroke engine, yet it is light weight, quiet and fuel efficient. The compact nature of the radial engine of the present disclosure results in a very low weight displacement ratio and consequently a satisfactory power-to-weight ratio. There are two rows of three cylinders each, for a total of six cylinders. This arrangement gives a firing impulse every 120 degrees, or three power impulses per revolution. Each of the two three-cylinder rows forms a system whose instantaneous mass center or centroid has an approximately circular locus that is exactly balanced by the equal and opposite mass system of the other cylinder row. That is, one cylinder row is in static balance with the other cylinder row. The measured dry weight of the radial engine of the present disclosure is less than 84 pounds. Each of the six cylinders is therefore required to produce only eleven horsepower to produce the desired horsepower range for powering a small aircraft. Each cylinder is individually exposed to its own flow of cooling air without the requirement for extensive baffling and ducting. The low per-cylinder horsepower output provides an additional cooling advantage making cooling demands for this engine very manageable.

SUMMARY OF THE INVENTION

In accordance with the present invention, a radial internal combustion engine comprises a crankcase housing and a plurality of equally spaced openings disposed in ring-like arrangement about the periphery of the crankcase housing. There are two rows of openings for receiving a piston and cylinder pair in each opening. Connecting rods connect the respective pistons to a crankshaft housed within the crankcase housing. The connecting rods are fastened to the pistons using large diameter full floating wrist pins. Each of the connecting rods for each row of cylinders lie in a common plane and connect to a common crankshaft journal. The connecting rods are secured to the crankshaft journal by a pair of retaining rings. Three connecting rods share each crankshaft journal bearing surface, each occupying approximately 25% of the journal circumference. Lubrication about the crankshaft journal is provided by an oil flow passage which extends through the crankshaft. Pressurized oil supplied through the oil flow passage continually lubricates the crankshaft journal so that the ends of the connecting rods freely slide on the crankshaft journal.

BRIEF SESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
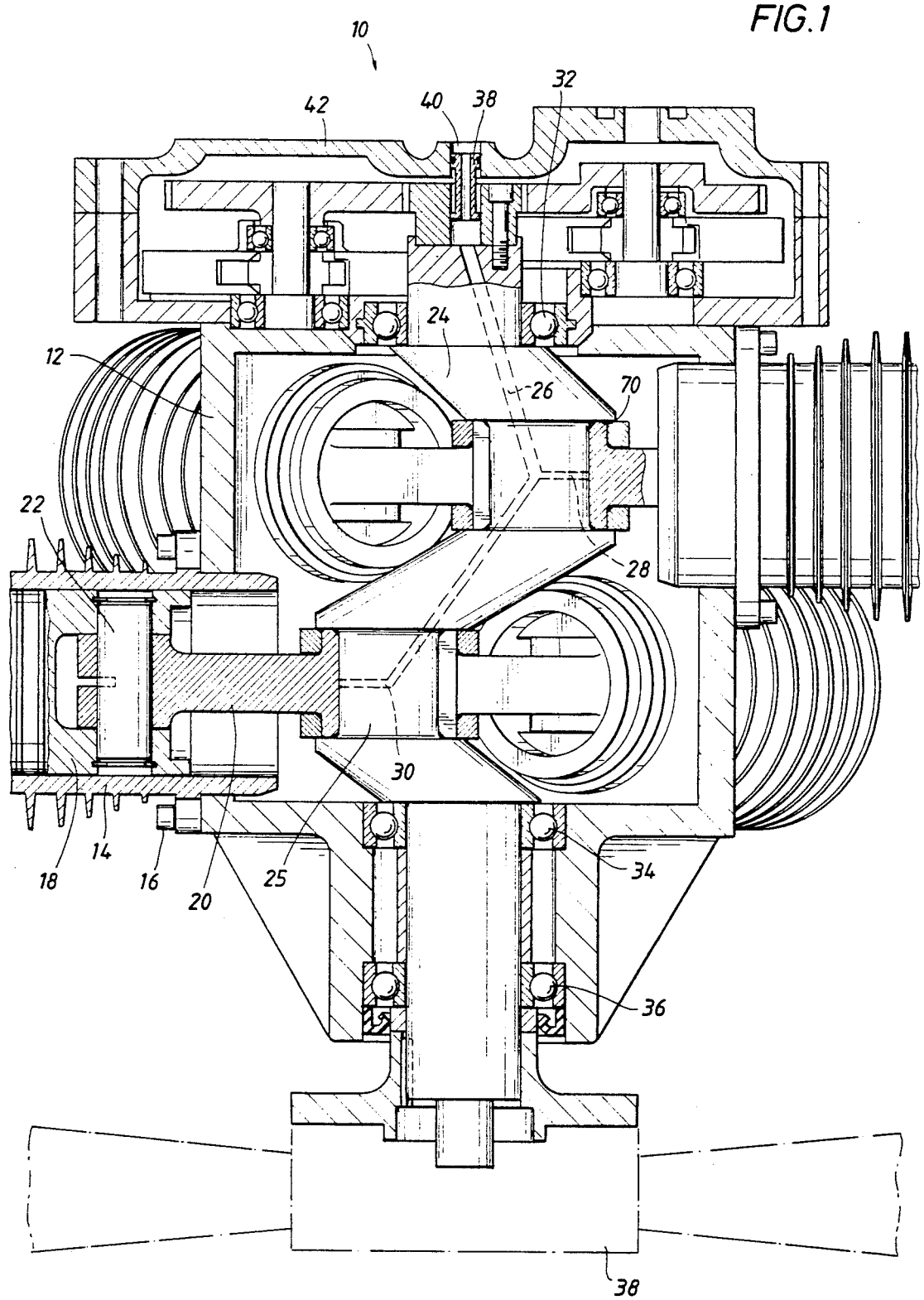
FIG. 1 is an axial section view of the radial internal combustion engine of the invention.

Referring first to FIG. 1 of the drawings, the radial internal combustion engine of the present disclosure is generally identified by the reference numeral 10. The radial engine 10 comprises a crankcase housing 12 defining a compact barrel-shaped hexagonal enclosure. It is understood however that the shape of the crankcase housing 12 may vary and is described as hexagonal for illustrative purpose only. The crankcase housing 12 is preferably cast in high strenght 356 aluminum and heat treated to T6. The housing 12 includes two rows of openings equally spaced in ring like arrangements around the periphery of the housing 12 for receiving cylinders 14. The cylinders 14 are securely mounted to the housing 12 by bolts 16 which thread into the housing 12. There are two rows of three cylinders 14 equally spaced around the periphery of the housing 12. Each row of cylinders 14 forms a systems whose instantaneous mass center or centroid has an approximately circular locus that is exactly balanced by the equal and opposite mass system of the other row of cylinders 14 so that each row of cylinders 14 is in static balance with the other row of cylinders 14. The two rows of cylinders 14 are slightly offset which results in a dynamic unbalanced or a "rocking couple" that is resolved along the aircraft longitudinal axis by the engine mounting system and a counterweighted crankshaft.

Disposed within each cylinder 14 is a piston 18 arranged for radial reciprocal movement within its respective cylinder 14. A piston connecting rod 20 is fastened to each piston by a large diameter full floating wrist pin 22. Each piston rod 20 extends inwardly through its respective opening in the crankcase housing 12 and is secured to a crankshaft 24 which extends axially along the longitudinal axis of the housing 12. As is well known in the art, each piston and cylinder arrangement is provided with individual cylinder heads, suitable means for firing, air and fuel inlets and exhaust outlets. These are not illustrated in the drawings, however, they will be described hereinafter.

The engine 10 includes individual cylinder heads for each cylinder 14. The cylinder heads are cast in 356 aluminum alloy heat treated to T6. Valve size and port areas are more than ample for each cylinders displacement and RPM. Cast iron valve seat inserts are cast integrally with the cylinder heads. Ports are arranged so that the inlet port faces rearward and the exhaust port faces forward allowing for simple and efficient inlet and exhaust manifolding. Both inlet and exhaust valves are preferably stainless steel Volkswagen racing types for durability and component availability. The inlet and exhaust valves ride in bronze valve guides pressed into the cylinder heads. Because of the low RPM range of the engine 10, the valve springs need only exert a pressure of approximately 40 pounds at midtravel, thereby reducing wear and tear on the valve drive train.

The cylinder heads include a 5 mm deep bathtub combustion chamber with a 2 mm quench height area above the pistons 18. This permits the compression ratio to be set at 9.5 to 1 and permits the use of unleaded preminum auto gasoline. Two spark plugs per cylinder are used to improve ignition reliability as well as combustion efficiency. The plugs are placed in the cylinder heads to minimize flame travel length and combustion knock tendency. The individual cylinder heads are installed on each cylinder 14 without a head gasket with four equal length 10 mm head studs.

The valve train of the engine 10 is unique in that it uses only one single small diameter cam for all inlet valves and another identical cam to drive all the exhaust valves. Each tappet housing holds all of the six inlet or exhaust roller tappets. The hardened steel cams run on ball bearing integral shafts to drive the roller tappets. The tappet housings are staggered in the rear case and drive overlapping pushrods to each rocker arm. Because the valves are arranged in line lengthwise along the radial engine 10 to place the exhaust forward and inlet rearward and the pushrods all come out of the engine rear case in a single plane, an unusual but effective rocker arm arrangement is used. Each rocker arm for a given cylinder 14 is displaced laterally to the left or right of the cylinder 14 center line. This allows the front exhaust rocker arm to miss the inlet valve and spring and allows the rear rocker arm to be similarly displaced from center to make room for the inlet manifold to pass between the pushrods on its way to the cylinder head inlet port.

Long rocker arms are used to joint the valves from the front cylinders 14 to the pushrods and relatively shorter ones are used for the rear cylinders 14. Although four different length rocker arms are used in the engine 10, each has a rocker lift ratio of exactly 1.5 to 1. Pivots for the rocker arms use two deep row ball bearings each to reduce friction and to maintain exact alignment between each rocker arm and its respective valve. Rocker arms are cast in heat treated 356-T6 aluminum alloy and have hardened steel inserts where they contact the valve and pushrods. Push rods are high strength 4130 steel. Tappets and pushrods are drilled to receive oil under pressure to supply the entire valve train with lubrication. Valve timing has a minimum of overlap and duration to maximize low end torque and provide useful horsepower in the range of 2800 RPM. Valve cam accelerations have been kept low in the interest of low valve train stress and long life.

Full pressure lubrication is supplied from an oil feed pump running at camshaft speed mounted to the rear case 42 of the engine 10. Oil under pressure is fed to the rear of the crankshaft 24 to the crankshaft journals 25 through an oil flow passage 26. Oil is directed through the oil flow passage 26 for continually lubricating the crankshaft journals 25 so that the ends of the connecting rods 20 freely slide on the crankshaft journals 25. The oil flow passage 26 branches into two outlet ports 28 and 30 for directing pressurized oil to the crankshaft journals. The outlet ports 28 and 30 are exposed as the crankshaft 24 rotates so that oil is sprayed into the interior of the crankshaft housing 12 for distribution of oil to the entire valve train. Because the base of the cylinders 14 protrude into the crankcase housing 12, drainage of oil into the lower portions of the cylinders 14 is prevented, thereby avoiding increased oil consumption or hydraulic lock on the lower ends of the cylinders 14 during start up of the engine 10.

The ignition and electrical system of the engine 10 comprises two completely independent electronic distributors which are driven from the rear case 42. Their shafts are mounted in double sealed ball bearings with individual gears that mesh with the main crankshaft timing gear. The distributors are of the battery-coil type. Solid state breakerless contact points are used to drive the standard coils to achieve optimum reliability and simplicity. The firing order of the radial engine 10 proceeds sequentially around the cylinders 14 in a direction opposite to the rotation of the crankshaft 24.

The fuel and manifold system of the radial engine 10 utilizes a circular plenum chamber at the rear of the crankcase housing 12. Separate manifolds join this chamber to the inlet port of each cylinder 14. A state-of-the-art throttle body fuel injection system is used to supply the correct fuel-air mixture. A heat system may be fabricated using the engine exhaust as the heat source. This fuel injection and manifolding system provides ease of starting, smooth running and good power response without undue complications.

Referring again to FIG. 1, it will be observed that the crankshaft 24 is axially supported within the crankshaft housing 12. The crankshaft 24 is preferably a steel forging and heat treated to a surface headness of C50 on the Rockwell scale. Three heavy duty, deep row ball bearing 32, 34 and 36 support the crankshaft 24 within the housing 12. Ball bearings 34 and 36 are located at the forward end of the housing 12 to provide rigidity for the crankshaft 24 against bending moments as well as absorb forces generated by the propeller 38, either gyroscopic or from push-pull thrush loads. The propeller 38 is mounted to the forward end of the crankshaft 24 projecting from the housing 12 in a customary and well known manner. The rear ball bearing 32, in addition to supporting the crankshaft 24, provides support for the main drive gear for the valve and accessory drive systems. Oil is supplied under pressure to the connecting rod journals 25 via the drilled oil flow passageway 26 which is fed through a rotary fitting 38 at the rear face of the crankshaft 24 through a cross drilled oil passage 40 in the rear cover case 42 of the engine 10.

Figure 3:
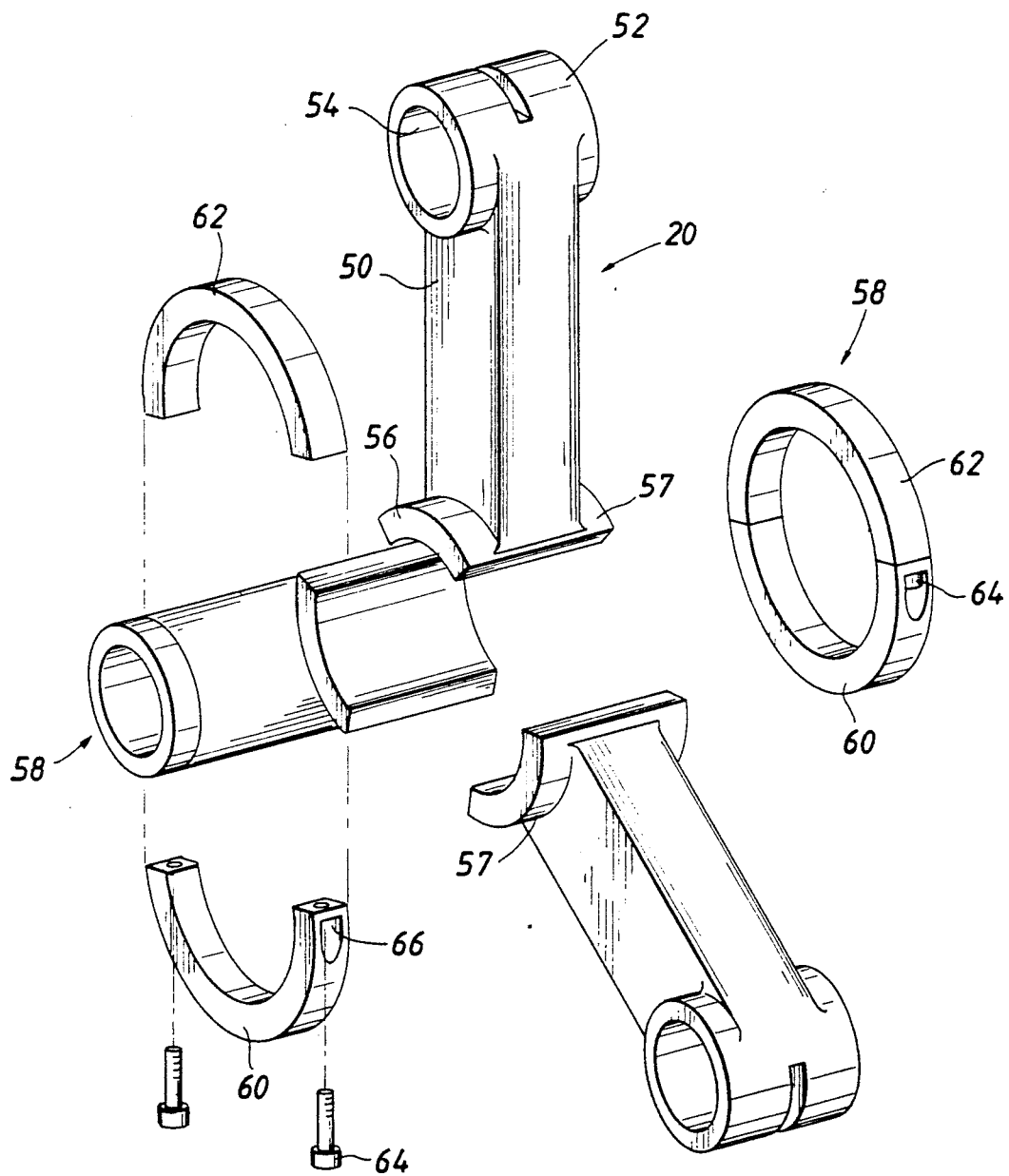
FIG. 3 is a partial exploded view showing the connecting rods of the invention for mounting to the engine crankshaft.

Referring now to FIG. 3, the piston connecting rods 20 of the radial engine 10 will be described in greater detail. The connecting rods 20 are identical, therefore like reference numerals will be used to identify like components. The connecting rods 20 are relatively short, being approximately 3.54 inches in length. The connecting rods 20 comprise a shaft 50 terminating in an enlarged end 52 for connection to the pistons 18. The end 52 defines a transverse opening 54 sized to receive the wrist pin 22 therethrough for connection of the connecting rods 20 to the pistons 18.

Each connecting rod 20 terminates in an arcuate flange 56 at the end opposite the enlarged end 52. The radius of curvature of the arcuate flange 56 corresponds to the radius of curvature of the crankshaft journal 25 for sliding mating engagement therewith. The arcuate flange 56 extends transversely to the shaft 50 defining a bearing surface 57 on either side of the shaft 50. The connecting rods 20 are steel forgings heat treated to a surface hardness of at least C50 on the Rockwell scale.

The connecting rods 20 are retained on the crankshaft journal 25 by a pair of retaining rings 58. The rings 58 comprise two halves or pieces 60 and 62 held together by two caps screws 64. The cap screws 64 extend through a slanted opening 66 formed in the split ring 60 and thread into a threaded hold formed in the ends of the split ring 62. Upon assembly, the connecting rods 20 are positioned about the crankshaft journal 25 and the split rings 60 and 62 are journaled about the connecting rod bearing surfaces 57 and threaded together with the cap screws 64. The retaining rings 58 are retained about the crankshaft journal 25 between the shaft 50 of the connecting rods 20 and circumferential shoulders 70 formed on the crankshaft 24, as best shown in FIG. 1.

The retaining rings 58 hold the connecting rods 20 on the crankshaft journal 25 during the compression stroke of each piston 18. The force required to retain the connecting rods 20 on the crankshaft journal 25 during a compression stroke is relatively small compared to the thrust force exerted by the pistons 18 during the power stroke. While the retaining rings 58 retain the connecting rods 20 to the crankshaft journal 25, the retaining rings 58 are relatively loose permitting the arcuate flanges 56 to slide on the surface of the crankshaft journal 25 as it completes its circular translatory path. The arcuate flanges 56 move toward and away from each other, however, they do not contact each other. The arcuate flanges 56 of the connecting rods 20 occupy approximately 75% of the circumference of the crankshaft journal 25. As previously noted, the crankshaft journals 25 are continually lubricated by a lubricant provided to the crankshaft journals 25 via oil passageway 26 and outlet 28 and 30. As the connecting rods 20 slide on the crankshaft journals 25, the outlets 28 and 30 are periodically uncovered permitting pressurized oil to be sprayed into the interior of the crankshaft housing 12 for lubricating the internal components of the radial engine 10.

Figure 2:
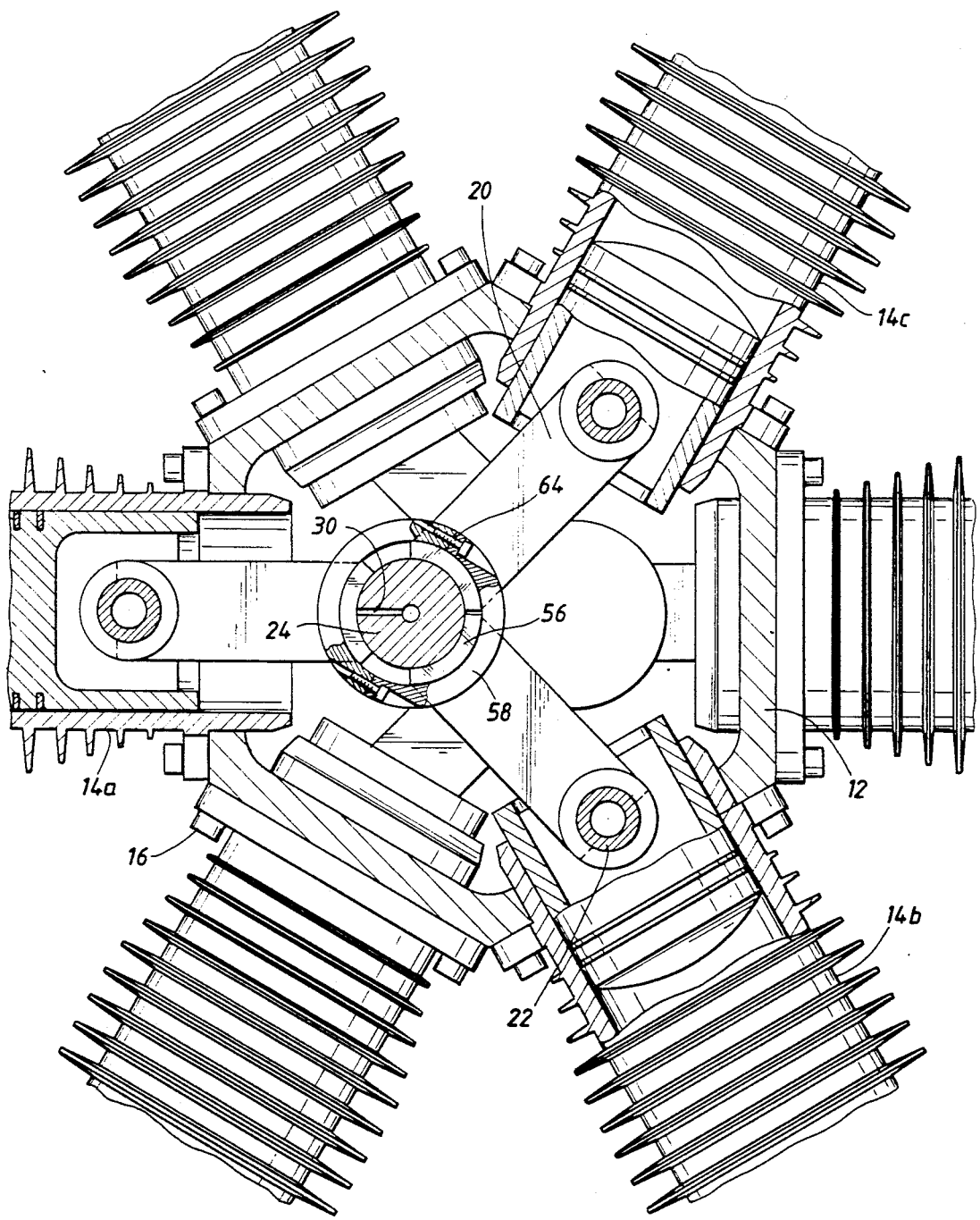
FIG. 2 is a radial plan view partly in section of the radial internal combustion engine of the invention.

In operation, the engine 10 of the invention operates on a four-stroke cycle. Each piston and cylinder pair is adapted to fire in a four cycle order. When the piston and cylinder pairs fire, the piston 18 is forced downwardly thereby forcing the connecting rod 20 downwardly against the crankshaft journal 25 to impart rotation to the crankshaft 24. The thrust or load transferred from the connecting rod 20 to the crankshaft journal 25 is substantially normal or at right angle to the surface of the crankshaft journal 25. Mathematical calculations establish that the bearing area of crankshaft journal 25 which is directly in line with the piston connecting rod 20 encounters substantially all of the thrust load of the firing piston 18. The connecting rod 20 is relatively short, being approximately 3.54 inches in length. While relatively short, the piston rod 20 is sufficiently long to retain a reasonable rod-piston axis angle. As the crankshaft journals 25 follow their circular translatory paths, they will force the pistons 18 upwardly to their compression stroke. The retention rings 58 hold the connecting rods 20 on the crankshaft journals 25 as the pistons 18 are forced upwardly in the cylinders 14 and a new fuel/air charge is drawn into the cylinders 14 for firing in a predetermined sequence. In FIG. 2, cylinder 14a illustrates the condition when the crankshaft journal is at top dead center, i.e., the firing position. Cylinder 14b is approaching the end of its exhaust stroke, while cylinder 14c is moving upwardly in its compression stroke prior to firing.

From the foregoing description, it will be seen that all of the parts of the described radial engine 10 are relatively simple and may be standardize. The manufacture of the engine 10 is greatly simplified and the parts can be assembled and disassembled with a minimum of effort. The pistons 18 and cylinders 14 are standard Volkswagen parts which have been extensively machined. The pistons 18 are forged aluminum with steel inserts. The cylinders 14 are made from centrifically cast iron with integral cooling fins. The use of stock components provides for a ready supply of spare parts, as well as eliminates any piston-cylinder interface design risk problems. The radial engine 10 has excellent air cooling characteristics. Each cylinder 14 is individually exposed to its own flow of cooling air without the requirement for extensive baffling and ducting. The crankcase housing 12 is of simple uniform shape and the low horsepower output per piston and air cooling characteristics of the engine 10 insure that no heat stress or uneven deformation will be caused by thermal expansion. Furthermore, the compact nature of the design of the radial engine 10 substantially reduces the weight of the engine resulting in a highly efficient, light weight aircraft engine.

It is, therefore, seen that this invention is one well adapted to obtain all of the objects and advantages hereinabove set forth. It will be understood that certain combinations and sub-combinations are of utility and may be employed without reference to other features and sub-combinations. This is contemplated by and is within the scope of the present invention.

As many possible embodiments may be made of this invention without departing from the spirit or scope thereof. It is to be understood that all matters hereinabove set forth or shown in the accompanying drawings are to be interpreted as illustrative and not in any limiting sense.

What is claimed is:

1. A radial internal combustion engine, comprising:
   (a) an engine housing;
   (b) a plurality of pistons and cylinders equally spaced in two rows about the periphery of said engine housing, a piston received within each of said cylinders;
   (c) a crankshaft axially positioned along the longitudinal axis of said housing, said crankshaft including crankshaft journal means defining a circular translatory path about the longitudinal axis of said crankshaft;

(d) three connecting rods retained on said crankshaft journal means, said connecting rods lying in a common plane about said crankshaft journal means, wherein each of said connecting rods terminate in an arcuate flange at a lower end thereof, said arcuate flanges having a radius of curvature equal to the radius of curvature of said crankshaft means;

(e) retaining ring means journaled about a lower end of said connecting rods for retaining said connecting rods on said crankshaft journal means, wherein said retaining ring means comprises a pair of split rings journaled about said crankshaft journal means and said arcuate flanges of said connecting rods; and (f) wherein said crankshaft includes a lubricant passage extending through said crankshaft, said lubricant passage branching and terminating at separate outlet ports, which outlet ports are periodically exposed by the circular translatory path of said crankshaft journal means permitting lubricant to spray into said engine housing.

2. The engine of claim 1 wherein each of said arcuate flanges of said connecting rods occupy approximately 25% of the circumferential bearing surface of said crankshaft journal means.

3. The engine of claim 1 wherein said two rows of pistons and cylinders are in static balance about the periphery of said engine housing.

4. The engine of claim 1 wherein said crankshaft journal means comprises two crankshaft journals offset and spaced 180° apart on said crankshaft.

5. The engine of claim 4 wherein said arcuate flanges occupy approximately 75% of the bearing surface of said crankshaft journal when mounted thereon.

6. The engine of claim 1 wherein said connecting rods comprise a shaft terminating at one end in an enlarged end defining a transverse opening for receiving a pin therethrough for connection to said pistons and terminating at the other end in a transverse arcuate flange for slidable retention on said crankshaft journal means.

* * * * *